United States Patent [19]

Faidiga

[11] Patent Number: 5,171,042
[45] Date of Patent: Dec. 15, 1992

[54] SPIGOT JOINT FOR LINED METALLIC PIPES PARTICULARLY FOR FLUIDS

[75] Inventor: Aldo Faidiga, Albisola Superiore, Italy

[73] Assignee: TDI Tubi Dalmine Ilva S.R.L., Genoa, Italy

[21] Appl. No.: 783,889

[22] Filed: Oct. 29, 1991

[30] Foreign Application Priority Data

Nov. 23, 1990 [IT] Italy .................. 22178 A/90

[51] Int. Cl.⁵ ............................................ F16L 27/00
[52] U.S. Cl. ........................................ 285/55; 285/51; 285/263; 285/286; 285/184; 403/131
[58] Field of Search ............. 285/51, 55, 263, 50, 285/286, 184, 166; 403/131, 122

[56] References Cited

U.S. PATENT DOCUMENTS

| | | | |
|---|---|---|---|
| 167,505 | 9/1875 | Crawford | 285/55 X |
| 390,240 | 10/1888 | Legat | 285/55 |
| 502,038 | 7/1893 | Herman | 285/51 |
| 551,193 | 12/1895 | Magee | 285/55 X |
| 880,813 | 3/1908 | Nailler | 285/55 |
| 969,423 | 9/1910 | Tanner et al. | 285/55 X |
| 1,870,959 | 4/1925 | Morrison | 285/55 X |
| 1,871,371 | 7/1929 | Jackson | 285/55 X |
| 2,273,154 | 4/1940 | Stromsoe | 285/55 |
| 2,274,257 | 7/1940 | Rockwood | 285/55 |
| 4,443,030 | 4/1984 | Hairston | 285/263 |
| 4,906,027 | 3/1990 | De Gruijter | 285/51 |

Primary Examiner—Randolph A. Reese
Assistant Examiner—Timothy Aberle
Attorney, Agent, or Firm—Herbert Dubno

[57] ABSTRACT

The spigot joint for metallic pipes, particularly for liquids comprises a protector for the lining of the pipe. The protector is associated with an end portion of the outer surface of the pipes.

3 Claims, 2 Drawing Sheets

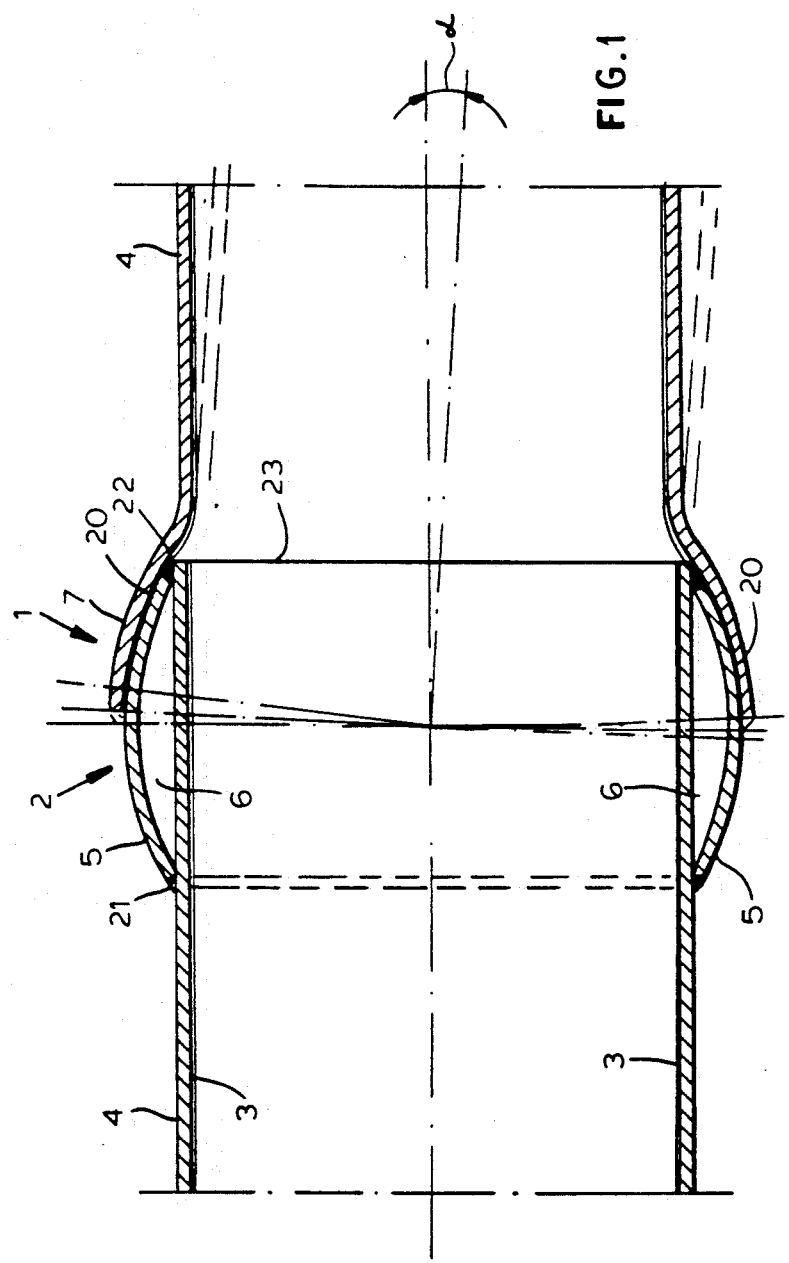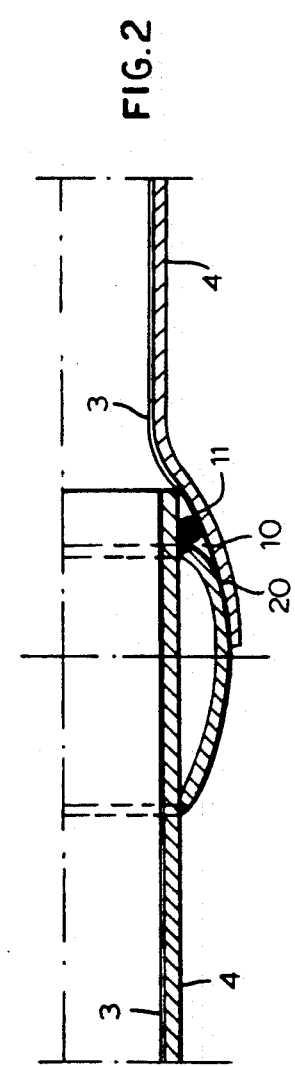

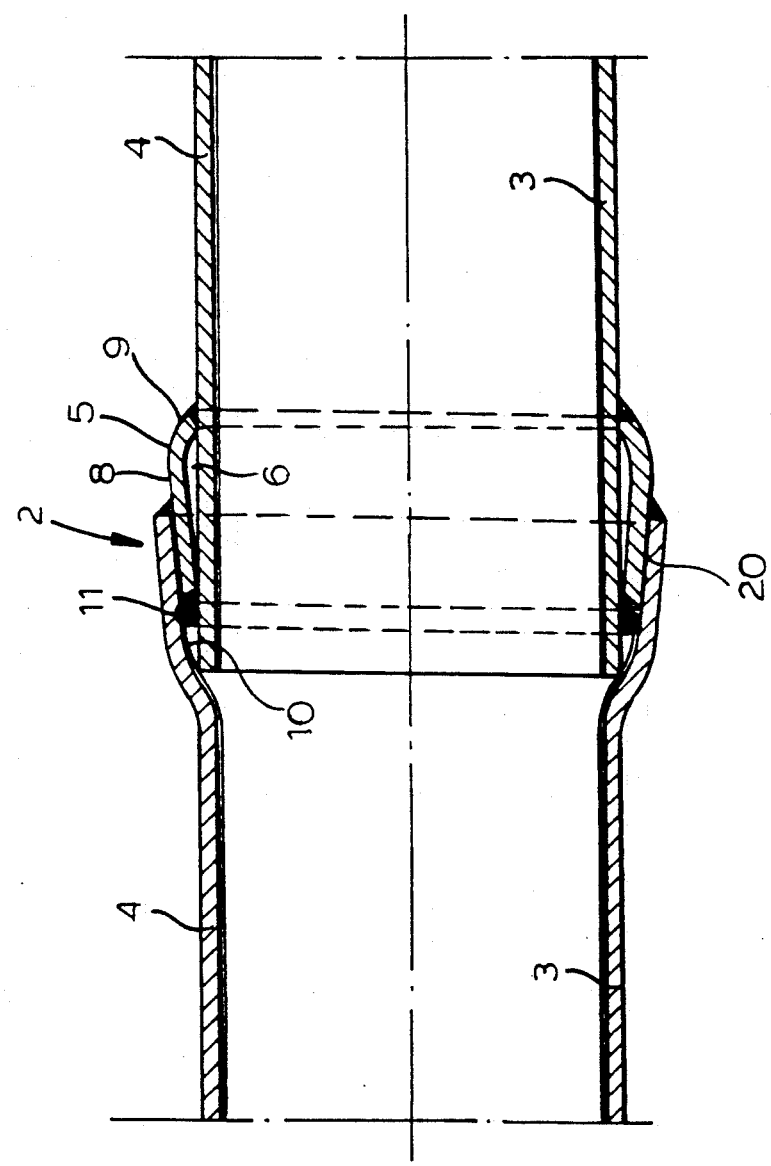

SPIGOT JOINT FOR LINED METALLIC PIPES PARTICULARLY FOR FLUIDS

FIELD OF THE INVENTION

The present invention relates to a spigot joint for metallic pipes, particularly for liquids.

BACKGROUND OF THE INVENTION

As is known, the provision of adequate joint systems is extremely important for the installation and the correct operation of pipes made of any material.

For this reason, in addition to research aimed at studying and producing the materials most suitable for manufacturing pipes, an extremely large number of types of joint have been proposed, made and tested.

Regardless of the method by which they are made, joints must comply with some fundamental and fully general requirements.

First of all, they must ensure perfect tightness during their entire period of operation, have a durability equal to the required durability of the pipe and have the same characteristics of resistance to the chemical, thermal and mechanical stresses to which the pipes are subjected.

The joints must, furthermore, be made easily and rapidly and must be economical so as to affect as little as possible the overall cost of the pipe.

For example, in the case of joints for metallic pipes for conveying liquids, such as water, the pipes must be coated with lining substances which withstand chemical and mechanical actions.

These lining substances can normally be, for example, epoxy paints or plastic linings importing to the pipe greater chemical-mechanical resistance and therefore greater durability.

Every time it is necessary to provide a weld for forming a joint between one pipe and another, the high temperature which is produced during welding deteriorates the heat sensitive lining, triggering all the disadvantages which can derive from the loss of the lining.

In order to obviate this disadvantage, ball joints for metallic pipes have already been studied wherein an inner lining is provided in the male part of each pipe and is subsequently welded on three faces to fix it to the inner surface of the pipe.

After welding, the inside of the pipe is cleaned by means of the methods usually employed, and then the lining which is resistant to chemical and mechanical actions is applied.

With this known system, the inner lining of the pipe is spaced from the welding region of the joint between two consecutive pipes so as to prevent the transmission of the heat generated by welding and thus the deterioration of the pipe lining.

However, the above described solution has numerous disadvantages.

For example, it is necessary to perform inside welds on three faces which are not always readily accessible, especially for small-diameter pipes.

The presence of the inside the pipe, welds which cannot be ground, furthermore, results in an irregularity of the pipe, and therefore an increase in the turbulence of the fluid during its passage through these regions.

It should also be noted that the lining in the regions above or adjacent to the welds is seldom perfectly uniform, with a consequent degradation in the quality of the finished product.

Finally, it should also be mentioned that in order to make the welds inside each pipe it is necessary to use specialized personnel and special equipment.

As a consequence, the provision of the prior joint entails considerable manufacturing time and high costs.

OBJECT OF THE INVENTION

The object of the present invention is to eliminate the above described disadvantages of the known art.

Another object is to provide a spigot joint for metallic pipes, particularly for liquids, which can be executed in an extremely short time and consequently at an advantageous cost.

Another object of the invention is to provide a spigot joint for metallic pipes particularly for fluids wherein all the welds of said joint are made on the outside of the pipe, thus simplifying the joint system as a whole and allowing the quality of the welds to be checked in an extremely important aspect of the invention.

A further object of the invention is to provide a spigot joint for metallic pipes particularly for fluids wherein the internal surface, by being continuous and substantially uninterrupted, has a reduced irregularity and therefore in practice a substantial decrease in the turbulence of the fluid during its flow in this region even with possible slight angles between the axes of two consecutive pipes.

SUMMARY OF THE INVENTION

These objects and others are substantially achieved by a spigot joint for metallic pipes, particularly for liquids, characterized in that it comprises means for protecting the lining of the pipes, said means being associated with an end portion of the outer surface of said pipes.

BRIEF DESCRIPTION OF THE DRAWING

The above and other objects, features and advantages of the present invention will become more readily apparent from the following description, reference being made to the accompanying drawing in which:

FIG. 1 is a transverse sectional lateral elevation view of a spigot joint for large-diameter pipes according to the invention;

FIG. 2 is an enlarged view of a detail of the region at which the annular element is welded to the outer surface of the pipe and at which it is possible to accommodate a sealing gasket; and FIG. 3 is a transverse sectional lateral elevation view of a spigot joint for a small-diameter pipe according to the invention.

SPECIFIC DESCRIPTION

The spigot joint according to the invention, generally indicated by the reference numeral 1, comprises protection means, generally indicated by 2, for the inner lining 3 of pipelines composed of a plurality of pipes, each of which is indicated by 4.

The protection means 2 are advantageously associated with an end portion of the outer surface of each pipe 4 and comprise an annular element 5 which defines, together with said end portion, at least one interspace 6.

In particular, the annular element 5 is an outwardly convex curved annular shell is cambered so that it can engage the female end 7 of the next pipe 4, allowing a possible inclination of one pipe with respect to the other by virtue of the curvature of the two complementary surfaces of both the annular element and the female end of the consecutive pipe.

The annular element 5 is furthermore provided, at least on the outer portion which makes contact with the female portion of the consecutive pipe, with a polymeric coating 20 to protect the two complementary contact surfaces from both chemical and mechanical actions.

The opposite edges 21 and 22 of the annular element are furthermore rigidly associated with the end portion of the pipe 4 by means of continuous annular welds.

If the pipes have a relatively small diameter, the annular shell or elements, as illustrated in FIG. 3, has a frustum-like configuration defined by two portions 8 and 9, one of which is inclined with respect to the other at an angle which defines the interspace 6 in this case as well.

In the spigot joint illustrated in FIG. 1 and in the one illustrated in FIG. 3, the annular element 5 defines, together with the end portion of the pipe and with the female end of the consecutive pipe, a seat 10 for accommodating a sealing gasket 11 suitable for cooperating with the welds and the polymeric coating 20 to prevent oxidation and thus the forming of rust in the joint.

In the case of pipes having a considerable diameter, the end portion on which the annular element is connected has a terminal flared region 23 which is suitable for guiding the fluid during its flow through it and for taking up any play between the surface of the pipe and the annular element when the latter is inserted thereon.

The terminal flared region furthermore allows inclination of two adjacent pipes in a different manner, for example by an angle α, while reducing the load losses due to the narrowing of the width of the transverse cross-section of the pipe.

The process for providing a spigot joint for metallic pipes is also a subject of the present invention and initially consists of inserting an annular element 5 in an end of a cylindrical pipe 4.

A flared region is subsequently provided on a portion of the end of the pipe 4 on which the annular element 5 has been inserted, and said annular element is moved onto the flared end region 23 so as to provide a negative-allowance coupling suitable for eliminating any play existing between the end portion of the pipe and the annular element.

The annular element is then rigidly connected to the flared region by means of an annular weld and then, in a conventional manner, the inner surface of the pipe is lined with a material which withstands chemical and mechanical actions.

In this manner it is possible to substantially produce spigot joints for metallic pipes in an extremely rapid, safe and economical manner.

In practice it has been observed that the spigot joint according to the invention is particularly advantageous also in that it has little internal roughness, thus eliminating the turbulence of the fluid during its flow in said region.

The joint according to the invention furthermore allows, without significant load losses, inclination of one pipe with respect to the other, ensuring the quality of the joint by virtue of the fact that all the welds can be checked externally without wasting time.

The invention thus conceived is susceptible to numerous modifications and variations, all of which are within the inventive concept; all the details may furthermore be replaced with technically equivalent elements.

In practice, the materials employed, as well as the dimensions, may be any according to the requirements and to the state of the art.

I claim:

1. A spigot-type pipe joint, comprising a first pipe formed with an end constituting a female member of said joint;

a second pipe formed with an end constituting a male member of said joint receiving said female member of said joint;

an annular outwardly convex shell closely surrounding said end of said first pipe and defining an annular space therewith, said annular shell having a camber relative to said first pipe;

respective circumferential weld seams at opposite axial ends of said shell welding said shell to said first pipe;

respective heat sensitive linings along interiors of said pipes;

an outwardly widening formation on said end of said second pipe with a camber complimentary to that of said shell and receiving said shell, and further comprising a sealing gasket compressed between a seat formed by said formation and one of said weld seams closest to said end of said first pipe.

2. A spigot-type pipe joint, comprising a first pipe formed with an end constituting a female member of said joint;

a second pipe formed with an end constituting a male member of said joint receiving said female member of said joint;

an annular outwardly convex shell closely surrounding said end of said first pipe and defining an annular space therewith, said annular shell having a camber relative to said first pipe;

respective circumferential weld seams at opposite axial ends of said shell welding said shell to said first pipe;

respective heat sensitive linings along interiors of said pipes;

an outwardly widening formation on said end of said second pipe with a camber complimentary to that of said shell and receiving said shell, and wherein said shell has two mutually inclined adjoining frustoconical portions.

3. A spigot-type pipe joint, comprising a first pipe formed with an end constituting a female member of said joint;

a second pipe formed with an end constituting a male member of said joint receiving said female member of said joint;

an annular outwardly convex shell closely surrounding said end of said first pipe and defining an annular space therewith, said annular shell having a camber relative to said first pipe;

respective circumferential weld seams at opposite axial ends of said shell welding said shell to said first pipe;

respective heat sensitive linings along interiors of said pipes;

an outwardly widening formation on said end of said second pipe with a camber complimentary to that of said shell and receiving said shell, and wherein said shell has a continuous curvature beginning at one end and ending at the opposite axial end of the shell.

* * * * *